Patented Feb. 10, 1931

1,791,876

UNITED STATES PATENT OFFICE

ALBERT A. SOMERVILLE, OF FLUSHING, NEW YORK, ASSIGNOR TO R. T. VANDERBILT COMPANY, OF NEW YORK, N. Y., A CORPORATION OF NEW YORK

VULCANIZATION OF RUBBER

No Drawing.   Application filed December 30, 1927.   Serial No. 243,777.

This invention relates to improvements in the vulcanization of rubber and includes a new method of vulcanization and a new rubber composition.

In the compounding and mixing of rubber it is customary to break down the rubber on the rubber mill and to work the compounding ingredients into the rubber on the mill. The breaking down and compounding of the rubber is accompanied with considerable self heating in addition to the heating of the rubber mix by the heated compounding rolls.

In the compounding and mixing of rubber containing the more active organic accelerators, and particularly those accelerators known as ultra-accelerators, trouble is frequently encountered and loss is frequently incurred from the "scorching" of a compound or premature vulcanization thereof during and after milling. In some cases precautions are taken to reduce the danger of scorching or premature vulcanization by cooling the rubber during compounding or immediately after compounding.

The present invention provides an improved process in which the danger of scorching or premature vulcanization is eliminated or minimized, and in which even ultra-accelerators may be employed without danger of scorching or premature vulcanization.

The present invention is based upon the discovery that by the addition of a small percentage of a suitable peroxide, and particularly of a non-acidic peroxide of a metal, such as lead peroxide, to a rubber compound containing an ultra-accelerator, the tendency to cure or vulcanize below temperatures corresponding to about 20 pounds steam pressure is eliminated or greatly reduced, without, however, appreciably prolonging the time required for satisfactory vulcanization at higher temperatures corresponding to the higher steam pressures which are commonly used in vulcanization.

Among the peroxides which I have found to be particularly valuable is lead peroxide, $PbO_2$. Non-acidic peroxides of certain other metals exert an action similar to that of lead peroxide but in varying degrees. Among such other metal peroxides may be mentioned the dioxides of alkaline earth metals, e. g., calcium, strontium, and barium. Barium peroxide is a valuable peroxide for use where white or light colored goods are desired.

The amount of the peroxide which it is necessary to add to obtain the desired elimination or reduction of danger of scorching is small. In some cases as small an amount as one-quarter of one percent or less of lead peroxide based on the rubber, is sufficient, while in other cases around one percent of lead peroxide based on the rubber, gives excellent results. The amount will vary with the particular peroxide employed and to some extent with the nature of the mix and particularly the nature of the accelerator or accelerators employed. In the case of barium peroxide, for example, around one percent based on the rubber has been found satisfactory with certain super-accelerators.

While I do not desire to limit myself by any theoretical explanation of the action of the metal peroxides in preventing or reducing scorching or pre-vulcanization, it seems probably that the action is one of oxidation of or combination with such small amounts of hydrogen sulfide or other reactive sulfur compounds as may be present or formed at low temperatures and which would otherwise initiate or bring about scorching or pre-vulcanization. The action of the peroxides moreover seems to be confined to their retarding or preventing of vulcanization at low temperature since, at higher temperatures, corresponding to the higher steam pressures commonly used in vulcanization, the vulcanization takes place readily and does not appear to be appreciably prolonged. The addition of the peroxide moreover has no appreciably or seriously deleterious effect on the aging of the vulcanized compounds.

The more active organic accelerators which cause or tend to cause scorching or premature vulcanization include ultra-accelerators, and the more active accelerators which are not commonly referred to as ultra-accelerators. Among such accelerators may be mentioned captax (mercaptobenzothiazole), tuads (tetramethylthiuramdisulfide), zimate (zinc dimethyldithiocarbamate), etc. Such accelerators may be used alone or in various admixtures.

The present invention is of more or less general application to the vulcanization of different rubber compounds containing various compounding materials such as zinc oxide, finely divided carbon, whiting, etc. In some cases acids such as stearic acid are advantageous and in other cases anti-oxidants such as agerite resin (the condensation product of aldol and alphanaphthylamine) can advantageously be employed.

In the practice of the invention, the ingredients of the rubber mix or compound can be compounded in the ordinary way on the rubber rolls but with incorporation of the peroxide in the rubber mix so that it is present during the milling operation and in the milled product. The rubber mix containing the peroxide is a stabilized rubber mix, and even though it may be heated to some extent on the rubber rolls and by self heating during compounding, it is nevertheless stabilized against objectionable scorching or prevulcanization at the temperatures to which it is ordinarily subjected during such operation. It can accordingly be stored after milling without the necessity of cooling, and without danger of objectionable scorching or prevulcanization during storage and before vulcanization.

The invention will be illustrated by the following specific examples, but the invention is not limited thereto, these examples being illustrative of the nature and advantages of the invention. In these examples, the accelerators employed are referred to by their trade name, for convenience, and agerite is also referred to by its trade name, the chemical nature of these materials being indicated above.

In the following examples, the abbreviation U. C. is used to indicate an uncured compound, while "poor cure" is used to indicate an undercured compound. In each example the compound employed is given both without the addition of the metal peroxide and with the addition of such peroxide in amount indicated, thus giving a direct comparison of the compounds containing the peroxide with the blank from which the peroxide is absent. Following the compounds are tables showing for each compound the time and steam pressure to which it is subjected and the tensile strength and elongation of the product so treated. Thus at the top of each column the expressions "5 at 10" means that the rubber compound is heated for five minutes to a temperature corresponding to ten pounds steam pressure. Similarly, the heading "20 at 40" indicates vulcanization for twenty minutes at forty pounds steam pressure. The results obtained are those obtained with test slabs of the kind commonly employed in rubber laboratories for testing and control purposes. The figures in each column indicate first the tensile strength and then the elongation, in accordance with customary practice indicating the results of testing rubber compounds.

The following example gives the results obtained with the use of captax (mercaptobenzothiazole) as an accelerator. This accelerator is not commonly considered an ultra-accelerator, but it is one which tends to cause scorching or prevulcanization unless special precautions are taken. The compound employed and the results obtained are in accordance with the above explanation.

|  | A1 | A2 | A3 |
|---|---|---|---|
| Pale crepe (rubber) | 100 | 100 | 100 |
| Zinc oxide | 5 | 5 | 5 |
| Quaker whiting | 50 | 50 | 50 |
| Sulphur | 4 | 4 | 4 |
| Stearic acid | 1 | 1 | 1 |
| Captax | .6 | .6 | .6 |
| Lead peroxide |  | 1/4 | 1 |

|  | 5 at 10 | 8 at 10 | 10 at 10 | 15 at 10 | 30 at 10 | 60 at 10 |
|---|---|---|---|---|---|---|
| A1 | 1560-800 | 2020-835 | 2420-820 | 2780-760 | 3480-740 | 3540-710 |
| A2 | U. C. | 1260-780 | 1820-815 | 2760-810 | 3340-760 | 3560-730 |
| A3 | U. C. | { Poor cure } | 1910-825 | 2740-790 | 3280-740 | 3670-720 |

|  | 3 at 20 | 5 at 20 | 8 at 20 | 10 at 20 | 15 at 20 | 30 at 20 | 60 at 20 |
|---|---|---|---|---|---|---|---|
| A1 | 1990-850 | 2460-825 | 2980-790 | 3060-755 | 3380-760 | 3420-705 | 3540-700 |
| A2 | { Poor cure } | 2180-800 | 2740-800 | 2760-780 | 3620-760 | 3480-735 | 3560-715 |
| A3 | U. C. | 2120-810 | 2700-790 | 2720-780 | 3440-770 | 3320-740 | 3320-725 |

|  | 3 at 40 | 5 at 40 | 10 at 40 | 20 at 40 | 40 at 40 | 60 at 40 |
|---|---|---|---|---|---|---|
| A1 | 2810-755 | 3120-730 | 3480-730 | 3360-715 | 2820-690 | 2420-655 |
| A2 | 2120-740 | 3140-750 | 3320-735 | 3320-725 | 2860-700 | 2740-700 |
| A3 | 2980-760 | 3340-750 | 3260-710 | 3220-690 | 2840-700 | 2480-680 |

|  | 5 at 60 | 10 at 60 | 15 at 60 | 30 at 2½ | 45 at 2½ | 60 at 2½ |
|---|---|---|---|---|---|---|
| A1 | 3260-715 | 3020-690 | 2820-695 | 2290-810 | 2980-750 | 3480-760 |
| A2 | 3240-725 | 2820-695 | 2680-710 | 1820-800 | 2810-760 | 3280-750 |
| A3 | 3420-730 | 3220-720 | 2960-700 | 970-785 | 2590-770 | 3480-750 |

The following example gives the results obtained with an ultra-accelerator (tuads or tetramethylthiuramdisulfide).

|  | A | A1 | A2 |
|---|---|---|---|
| Pale crepe (rubber) | 100 | 100 | 100 |
| Zinc oxide | 5 | 5 | 5 |
| Quaker whiting | 50 | 50 | 50 |
| Sulphur | 4 | 4 | 4 |
| Tuads | 3/16 | 3/16 | 3/16 |
| Lead peroxide |  | 1/4 | 1 |

|  | 45 at 2½ | 60 at 2½ | 5 at 10 | 10 at 10 | 15 at 10 | 30 at 10 |
|---|---|---|---|---|---|---|
| A | 3780-730 | 3790-725 | U. C. | 2960-730 | 3520-705 | 3740-705 |
| A1 |  |  | U. C. | U. C. | U. C. | 800-720 |
| A2 |  |  | U. C. | U. C. | U. C. | U. C. |

|   | 3 at 20 | 5 at 20 | 8 at 20 | 10 at 20 | 20 at 20 | 30 at 20 | 60 at 20 |
|---|---|---|---|---|---|---|---|
| A | Poor cure | 2820–750 | 3600–750 | 3580–745 | 3680–720 | 3640–715 | 3420–700 |
| A1 | U. C. | U. C. | U. C. | 785–715 | 1940–740 | 2860–765 | 3500–740 |
| A2 | U. C. | U. C. | U. C. | U. C. | 1170–700 | 2020–740 | 3480–760 |

|   | 3 at 40 | 5 at 40 | 10 at 40 | 20 at 40 | 30 at 40 | 60 at 40 |
|---|---|---|---|---|---|---|
| A | 3460–770 | 3520–725 | 3480–715 | 3140–705 | 3260–710 | 2920–710 |
| A1 | 1320–745 | 2220–810 | 2980–720 | 3360–720 | 3260–740 | 3040–730 |
| A2 | Poor cure | 1520–760 | 2960–735 | 3180–710 | 3340–710 | 3080–740 |

|   | 5 at 60 | 10 at 60 | 15 at 60 |
|---|---|---|---|
| A | 3360–750 | 3220–725 | 3160–735 |
| A1 | 3250–750 | 3280–720 | 3160–725 |
| A2 | 3020–730 | 3040–725 | 3020–720 |

The following example gives the results obtained with another ultra-accelerator (zimate or zinc dimethyldithiocarbamate) in a compound in which an anti-oxidant (agerite) is also employed.

|   | A | A1 | A2 |
|---|---|---|---|
| Smoked sheets (rubber) | 100 | 100 | 100 |
| Zinc oxide | 5 | 5 | 5 |
| Thermatomic carbon | 25 | 25 | 25 |
| Stearic acid | 1 | 1 | 1 |
| Sulphur | 3 | 3 | 3 |
| Agerite resin | 1 | 1 | 1 |
| Zimate | 3/16 | 3/16 | 3/16 |
| Lead peroxide |  | 1 | 1/4 |

|   | 15 at 2½ | 30 at 2½ | 45 at 2½ | 5 at 10 | 10 at 10 | 15 at 10 | 30 at 10 |
|---|---|---|---|---|---|---|---|
| A | 3360–870 | 4630–810 | 4000–780 | 3280–820 | 3780–810 | 4430–800 | 4700–770 |
| A1 | U. C. | U. C. | Poor cure | U. C. | U. C. | Poor cure | 670–800 |
| A2 | U. C. | U. C. | U. C. | U. C. | U. C. | U. C. | U. C. |

|   | 3 at 20 | 5 at 20 | 8 at 20 | 10 at 20 | 20 at 20 | 30 at 20 | 60 at 20 |
|---|---|---|---|---|---|---|---|
| A | 3510–840 | 4180–840 | 4340–800 | 4330–785 | 4420–750 | 4490–740 | 4250–740 |
| A1 | U. C. | U. C. | Poor cure | 740–870 | 1320–880 | 2340–800 | 4020–830 |
| A2 | U. C. | U. C. | U. C. | Poor cure | 3300–840 | 3760–790 | 4380–850 |

|   | 3 at 40 | 5 at 40 | 10 at 40 | 20 at 40 | 30 at 40 | 60 at 40 |
|---|---|---|---|---|---|---|
| A | 3720–760 | 4260–780 | 3880–720 | 3800–720 | 3780–710 | 3260–700 |
| A1 | 1420–840 | 2160–860 | 3440–820 | 3500–760 | 3700–770 | 3650–790 |
| A2 | 2520–850 | 3290–840 | 4050–790 | 4140–800 | 4070–750 | 3980–730 |

|   | 3 at 60 | 5 at 60 | 10 at 60 | 15 at 60 |
|---|---|---|---|---|
| A | 3640–710 | 3780–750 | 3220–710 | 2800–730 |
| A1 | 2700–780 | 3500–800 | 3780–780 | 3440–740 |
| A2 | 3740–810 | 3810–780 | 3940–760 | 3920–775 |

A particularly active mixture of accelerators is one in which both captax and D. P. G. (diphenylguanidine) are employed. Compounds made with these accelerators together are self-curing at only slightly elevated temperatures if permitted to stand overnight and will air-cure in a warm room on standing. Such danger of scorching or self-curing or precuring is obviated or minimized by adding a peroxide such as lead peroxide, as indicated by the following example.

|   | A | A1 |
|---|---|---|
| Smoked sheets (rubber) | 100 | 100 |
| Zinc oxide | 5 | 5 |
| Thermatomic carbon | 25 | 25 |
| Stearic acid | 1 | 1 |
| Sulphur | 3 | 3 |
| Agerite | 1 | 1 |
| Captax | .5 | .5 |
| D. P. G. | .5 | .5 |
| Lead peroxide |  | 1 |

|   | 10 at 2½ | 15 at 2½ | 30 at 2½ | 45 at 2½ |
|---|---|---|---|---|
| A | 3080–870 | 3720–850 | 4360–800 | 4860–740 |
| A1 | U. C. | U. C. | 3320–820 | 4160–740 |

|   | 3 at 10 | 5 at 10 | 10 at 10 | 15 at 10 | 30 at 10 |
|---|---|---|---|---|---|
| A | 2350–870 | 2780–840 | 3860–770 | 4410–740 | 4810–720 |
| A1 | U. C. | U. C. | 2940–810 | 3640–810 | 4460–770 |

|   | 3 at 20 | 5 at 20 | 8 at 20 | 10 at 20 | 20 at 20 | 30 at 20 | 60 at 20 |
|---|---|---|---|---|---|---|---|
| A | 3700–850 | 4130–810 | 4520–780 | 4540–720 | 4520–710 | 4520–660 | 3780–620 |
| A1 | U. C. | 3100–830 | 4000–820 | 4460–780 | 5000–740 | 4400–650 | 3750–600 |

|   | 3 at 40 | 5 at 40 | 10 at 40 | 20 at 40 | 30 at 40 | 60 at 40 |
|---|---|---|---|---|---|---|
| A | 4230–740 | 4670–740 | 4260–660 | 3980–630 | 3620–610 | 3400–610 |
| A1 | 4300–800 | 4600–730 | 4710–700 | 4400–650 | 3920–590 | 3340–580 |

|   | 3 at 60 | 5 at 60 | 10 at 60 | 15 at 60 |
|---|---|---|---|---|
| A | 3920–640 | 4100–610 | 4060–600 | 2270–520 |
| A1 | 4050–680 | 3980–620 | 3910–620 | 3190–620 |

In the foregoing example, the peroxide employed is lead peroxide or dioxide and its use is particularly advantageous for dark colored stocks and goods. For light colored products, barium peroxide can be advantageously employed, as indicated by the following example, in which an ultra-accelerator (zimate) is employed.

|   | A | A1 |
|---|---|---|
| Smoked sheets (rubber) | 100 | 100 |
| Zinc oxide | 50 | 50 |
| Stearic acid | 1 | 1 |
| Sulphur | 3 | 3 |
| Agerite resin | 1 | 1 |
| Zimate | 3/16 | 3/16 |
| Barium peroxide |  | 1 |

|   | 15 at 2½ | 30 at 2½ | 45 at 2½ | 10 at 10 | 20 at 10 |
|---|---|---|---|---|---|
| A | Poor cure | 1920–855 | 2280–800 | Poor cure | 2200–800 |
| A1 | U. C. | Poor cure | 1220–880 | Poor cure | 1680–855 |

|    | 3 at 40   | 5 at 40   | 10 at 40  | 20 at 40  | 30 at 40  |
|----|-----------|-----------|-----------|-----------|-----------|
| A  |           | 2540-790  | 2820-740  | 3680-740  | 3520-715  | 3620-730 |
| A1 |           | 2040-740  | 2220-725  | 2920-760  | 2980-750  | 2800-800 |

|    | 3 at 60   | 5 at 60   | 10 at 60  | 15 at 60  |
|----|-----------|-----------|-----------|-----------|
| A  |           | 3280-740  | 3620-740  | 3280-725  | 2580-710 |
| A1 |           | 3000-770  | 2960-750  | 2760-760  | 2220-730 |

From the foregoing examples, which illustrate the improved process of the invention, it will be seen that the addition of the peroxide to the rubber mix effectively prevents scorching or prevulcanization at temperatures ordinarily met with in the milling of the rubber prior to vulcanization; but that the addition of the peroxide does not interfere with the vulcanization of the rubber at higher temperatures, commonly employed for vulcanization. Even with the unusually active mixture of captax and D. P. G., the compound is stabilized so that it is protected against air-curing or prevulcanization under ordinary conditions of handling in the mill. The compounded and unvulcanized rubber mix or composition is a stabilized composition which can be kept and stored without the necessity of cooling it to a low temperature and without danger of self-vulcanization during storage.

I claim:—

1. The improvement in the vulcanization of rubber with the aid of an active accelerator which comprises incorporating in the rubber compound a small amount of a peroxide having the property of preventing or retarding scorching or prevulcanization of the rubber compound.

2. The improvement in the vulcanization of rubber with the aid of an active accelerator which comprises incorporating in the rubber compound a small amount of a metal peroxide having the property of preventing or retarding scorching or prevulcanization of the rubber compound.

3. The improvement in the prevention or retarding of scorching or pervulcanization of rubber compounds containing an active accelerator which comprises incorporating in the rubber compound a small amount of lead peroxide.

4. An unvulcanized rubber compound containing an active accelerator and a small amount of a peroxide having the property of preventing or retarding scorching or prevulcanization of the compound during the milling and subsequent storage of the unvulcanized compound.

5. An unvulcanized rubber compound containing an active accelerator and a small amount of a metal peroxide having the property of preventing or retarding scorching or prevulcanization of the compound during the milling and subsequent storage of the unvulcanized compound.

6. An unvulcanized rubber compound containing an active accelerator, said compound being stabilized against scorching or prevulcanization by the addition of a small amount of lead peroxide.

7. The improvement in the prevention or retarding of scorching or pre-vulcanization of rubber compounds containing an active accelerator, which comprises incorporating in the rubber compound a small amount of a barium peroxide.

8. An unvulcanized rubber compound containing an active accelerator, said compound being stabilized against scorching or pre-vulcanization by the addition of a small amount of barium peroxide.

In testimony whereof I affix my signature.

ALBERT A. SOMERVILLE.